US011285758B2

(12) United States Patent
Sollik et al.

(10) Patent No.: US 11,285,758 B2
(45) Date of Patent: Mar. 29, 2022

(54) COMMERCIAL VEHICLE, IN PARTICULAR HEAVY-DUTY VEHICLE, AND WHEEL ASSEMBLY FOR SUCH A COMMERCIAL VEHICLE

(71) Applicant: GOLDHOFER AG, Memmingen (DE)

(72) Inventors: Robert Sollik, Memmingen (DE);
Mathias Würzler, Memmingen (DE);
Felix Merkel, Memmingen (DE)

(73) Assignee: GOLDHOFER AG, Memmingen (DE)

( * ) Notice: Subject to any disclaimer, the term of this patent is extended or adjusted under 35 U.S.C. 154(b) by 714 days.

(21) Appl. No.: 16/081,801

(22) PCT Filed: Mar. 3, 2017

(86) PCT No.: PCT/EP2017/055041
§ 371 (c)(1),
(2) Date: Aug. 31, 2018

(87) PCT Pub. No.: WO2017/149136
PCT Pub. Date: Sep. 8, 2017

(65) Prior Publication Data
US 2021/0213779 A1      Jul. 15, 2021

(30) Foreign Application Priority Data

Mar. 4, 2016   (DE) .................. 10 2016 203 577

(51) Int. Cl.
*B60B 35/12*       (2006.01)
*B60B 11/00*       (2006.01)
(Continued)

(52) U.S. Cl.
CPC ............ *B60B 35/122* (2013.01); *B60B 11/00* (2013.01); *B60B 35/14* (2013.01); *B60K 17/02* (2013.01);
(Continued)

(58) Field of Classification Search
CPC ....... B60B 35/122; B60B 11/00; B60B 35/14; B60B 2900/711; B60K 17/165; B60K 17/02; B60K 17/14
See application file for complete search history.

(56) References Cited

U.S. PATENT DOCUMENTS 3,693,741 A * 9/1972 Scheuerle .............. B62D 61/10
180/23
9,931,889 B2 * 4/2018 Merkel ................ B60B 35/007
(Continued)

FOREIGN PATENT DOCUMENTS

CN       102059920 A     5/2011
CN       102774239 A    11/2012
(Continued)

OTHER PUBLICATIONS

Japanese Application No. 2018-546535, Japanese Office Action dated Aug. 28, 2020, No English translation available, 6 pages.
(Continued)

*Primary Examiner* — Jacob B Meyer
(74) *Attorney, Agent, or Firm* — Kilpatrick Townsend & Stockton LLP

(57) ABSTRACT

The invention relates to a commercial vehicle, in particular a heavy-duty vehicle, comprising a plurality of wheel assemblies mounted on a vehicle frame. At least one of the wheel assemblies comprises an elongate wheel carrier, a wheel at each of the longitudinal ends of the wheel carrier, a drive unit for driving the wheels, and a transmission device. According to the invention, the at least one wheel assembly further comprises a clutch device which selectively interrupts or establishes a power transmission connection between the drive unit and the wheels, and a brake (Continued)

Figure 1:
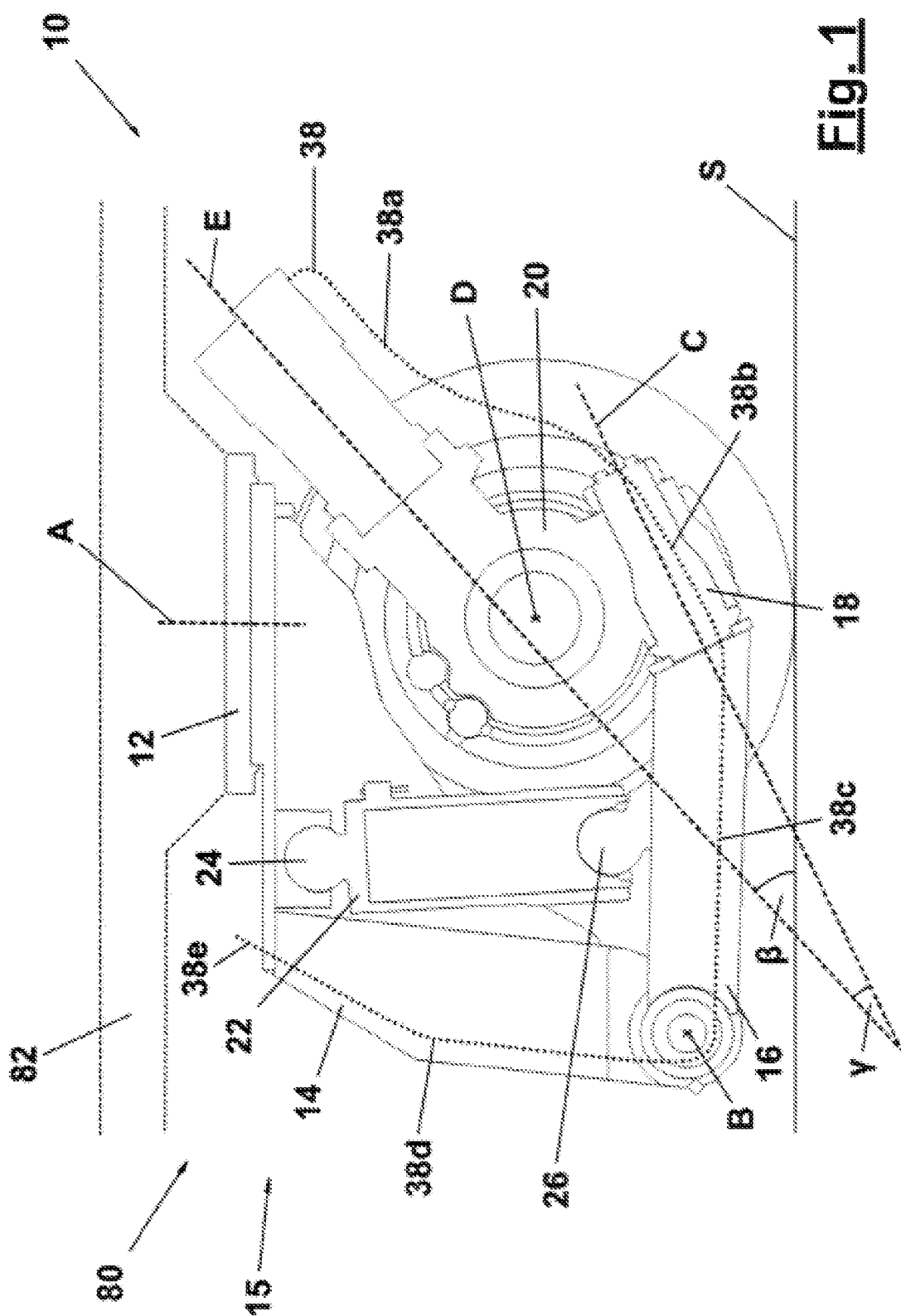

device which is approved for the operation of the commercial vehicle on public roads up to speeds of more than 25 km/h.

20 Claims, 2 Drawing Sheets

(51) Int. Cl.
    *B60B 35/14*     (2006.01)
    *B60K 17/02*     (2006.01)
    *B60K 17/14*     (2006.01)
    *B60K 17/16*     (2006.01)

(52) U.S. Cl.
    CPC ............ *B60K 17/14* (2013.01); *B60K 17/165* (2013.01); *B60B 2900/711* (2013.01)

(56) References Cited

U.S. PATENT DOCUMENTS

| | | | |
|---|---|---|---|
| 2015/0123452 A1* | 5/2015 | Boeer | B60K 17/046 301/6.5 |
| 2015/0266505 A1* | 9/2015 | Merkel | B62D 7/144 180/411 |
| 2016/0236709 A1* | 8/2016 | Faymonville | B60B 35/025 |

FOREIGN PATENT DOCUMENTS

| | | | |
|---|---|---|---|
| DE | 1910809 | 9/1970 | |
| DE | 202009014438 | 5/2010 | |
| DE | 102009050679 | 4/2011 | |
| DE | 102013007924 | 11/2013 | |
| DE | 102014202724 | 8/2015 | |
| DE | 102014007979 | 12/2015 | |
| EP | 2314469 | 4/2011 | |
| JP | S62251235 A | 11/1987 | |
| JP | H11255158 A | 9/1999 | |
| JP | 2001347971 A | 12/2001 | |
| JP | 2010071353 A | 4/2010 | |
| WO | 2004074031 | 9/2004 | |
| WO | 2013167279 | 11/2013 | |
| WO | WO-2013167279 A1 * | 11/2013 | ........... B60K 7/0007 |
| WO | 2014053478 | 4/2014 | |

OTHER PUBLICATIONS

German Application No. 102016203577.0 , German Search Report dated Dec. 13, 2016.
International Application No. PCT/EP2017/055041 , "International Search Report and Written Opinion", dated Aug. 21, 2017.
Australian Application No. AU2017226640, "First Examination Report", dated Jun. 18, 2021, 3 pages.
Chinese Application No. 201780025568.0, Chinese First Office Action dated Jul. 6, 2021, 18 pages.

* cited by examiner

COMMERCIAL VEHICLE, IN PARTICULAR HEAVY-DUTY VEHICLE, AND WHEEL ASSEMBLY FOR SUCH A COMMERCIAL VEHICLE

The invention relates to a commercial vehicle, in particular a heavy duty vehicle, comprising a vehicle frame and a plurality of wheel assemblies mounted on the vehicle frame, wherein at least one of the wheel assemblies comprises an elongate wheel carrier having a longitudinal axis, a wheel that is rotatable about the longitudinal axis at each of the longitudinal ends of the wheel carrier, a drive unit for driving the wheels, and a transmission device, which is designed to lower the rotational speed of a driven shaft of the drive unit to a rotational speed of the wheels.

Commercial vehicles are referred to as heavy duty vehicles when they do not meet the requirements of the German Road Vehicle Registration and Licensing Regulation (StVZO) with regard to the maximum permissible vehicle dimensions under Section 32, the cornering characteristics (permissible traversed ring area width for a given outer radius) under Section 32*d* or the compliance with maximum permissible axle loads under Section 34, and operators are only permitted to use them on public roads after obtaining the appropriate special authorizations (under Section 29 and Section 70).

Such commercial vehicles are produced and sold, for example, by the applicant in the form of self-propelled heavy-duty vehicle under the designation PST. These heavy-duty vehicles are designed and approved for speeds up to 15 km/h. They are therefore not equipped with a service brake, but have only a hand brake, which prevents the vehicle from inadvertently rolling away when stationary. The function of the service brake is implemented by appropriate activation of the drive units of the wheel assemblies.

The self-propelled heavy-duty vehicles PST have the disadvantage that these are not suitable for covering large distances quickly, for example by way of a long-distance trip. Furthermore, there are passive, which is to say non-driven, vehicles not of the type in question, which additionally require a tractor unit for operation since these are only trailer vehicles. These passive trailer vehicles can be used to cover large distances quickly since these are usually approved for speeds up to 80 km/h. The disadvantage, however, is that it may be necessary on uphill grades to provide another tractor unit and/or a pushing vehicle, in addition to the tractor unit.

It is therefore the object of the invention to provide a commercial vehicle of the type mentioned above, which is suitable for quickly covering distances.

This object is achieved according to the invention by a commercial vehicle of the type mentioned above, in which the at least one wheel assembly furthermore comprises a clutch device that selectively interrupts or establishes a power transmission connection between the drive unit and the wheels, and a brake device that is approved for the operation of the commercial vehicle on public roads up to speeds of more than 25 km/h.

The commercial vehicle according to the invention can be approved under road traffic laws for rapid long-distance trips since the at least one wheel assembly includes a service brake that is approved for the operation of the commercial vehicle on public roads up to speeds of more than 25 km/h, preferably of up to at least 80 km/h, and still more preferably for the entire speed range of 0 km/h to 80 km/h.

Since the drive unit for driving the wheels of the at least one wheel assembly is preferably only designed up to a lower predetermined speed, for example 15 km/h, so as to continue to be able to use the drive unit used in the known self-propelled heavy duty vehicles PST of the applicant, this creates the problem of the rotating components of the drive unit becoming overloaded in the passive trailing operation at speeds of more than the lower predetermined speed. According to the invention, a clutch device is thus furthermore provided, which interrupts the power transmission connection between the drive unit and the wheels at speeds above the lower predetermined speed. In this state, the commercial vehicle according to the invention can be operated as a passive, which is to say non-driven, trailer vehicle, which is moved by way of a tractor unit.

If the towing combination formed of the tractor unit and the commercial vehicle according to the invention arrives at an uphill grade, no additional tractor unit and/or pushing vehicle has to be provided. Rather, it is possible to negotiate the uphill grade segment at a speed that, at the most, is identical to the lower predetermined speed, so that the drive unit(s) of the commercial vehicle can assist the tractor unit.

For reasons of operational safety, it is advantageous when the clutch device is designed so as to automatically interrupt the power transmission connection between the drive unit and the wheels when a predetermined speed of the commercial vehicle is exceeded.

In the generic self-propelled heavy-duty vehicle PST of the applicant, all components are accommodated in a cavity of the wheel carrier. It is easy to see that it is not readily possible to provide additional components, these being the clutch device and the service brake device, in the same installation space. To address this problem, it is proposed according to the invention that the drive unit is arranged outside the wheel carrier, and preferably mounted thereon downstream of the wheel carrier in the driving direction of the commercial vehicle. It may furthermore be provided that the driven shaft of the drive unit extends substantially perpendicularly to the axis of rotation of the wheels.

Advantageously, it may be provided that the driven shaft of the drive unit is connected to a differential gear comprising two output shafts having axes of rotation that are substantially parallel to the axis of rotation of the wheels. Furthermore, the differential gear can be designed as a reducing gear and/or comprise a reducing gear.

So as to be able to use compact components, and in particular components that can be accommodated in the wheel carrier housing, it is proposed in one refinement of the invention to assign a separate clutch and/or a separate reducing gear and/or a separate brake that is approved for the operation of the commercial vehicle on public roads up to speeds of more than 25 km/h to each of the wheels. The two clutches together form the aforementioned clutch device and/or the two brakes together form the aforementioned brake device.

So as to be able to provide more space for accommodating components while keeping the track width the same, it may be provided that the wheel disks of the rims of the two wheels have a positive offset. A positive offset exists when the wheel disks are arranged offset from the wheel carrier in relation to the centerline of the rim. This allows the wheel carrier to be longer, so that the interior space of the wheel carrier housing available for accommodating the components can also be designed to be larger.

The two wheels of a wheel assembly usually each have dual tires. It is advantageous, in particular with respect to wheel mounting, when the rim of the wheel comprising dual tires includes two sub-rims, namely a separate sub-rim for each of the two tires. Since the two sub-rims are spaced apart from one another for operational safety reasons, the center of the rim is arranged between the two sub-rims in this case. The wheel disk is also composed of two sub-wheel disks in this case, of which each is assigned to a sub-rim. When the dual tires are mounted on the wheel hub, the two sub-wheel disks rest against one another.

If the wheels of the wheel assembly each include dual tires, it is advantageous when the offset is dimensioned such that the wheel disk is arranged within the extension, determined in the longitudinal direction of the wheel carrier, of the tire of the respective wheel arranged remote from the wheel carrier, which is to say the respective outer tire.

As is known per se, the wheel carrier is mounted on the vehicle frame by way of a bogie so as to be able to rotate about a substantially vertical axis. The bogie usually comprises a pivot bearing which is connected to the vehicle frame and from which a carrier that is rigidly connected to the pivot bearing extends. At the free end of the carrier, a swing arm is arranged, which is mounted relative to the carrier so as to pivot about a substantially horizontal axis. A self-aligning bearing, to which the wheel carrier is connected, is arranged at the free end of the swing arm, and thus also at the free end of the bogie. The self-aligning bearing axis preferably extends in a plane that is perpendicular to the longitudinal axis of the wheel carrier. In contrast, the swing arm and the wheel carrier are connected rigidly to one another with respect to a relative pivoting movement about an axis that is substantially parallel to the longitudinal axis of the wheel carrier.

Furthermore, a variable-length power device is provided, which is supported on the pivot bearing and/or on the carrier on one side, and on the swing arm on the other side. This power device, which can be formed by a, preferably hydraulically actuatable, piston/cylinder unit, can be used to vary the distance between the wheel carrier and the vehicle frame, for example within the meaning of a level regulation.

In this connection, it is furthermore proposed that the self-aligning bearing axis and the driven shaft of the drive unit form an angle between approximately 8° and approximately 24°, preferably an angle between approximately 12° and approximately 20°, and still more preferably an angle of approximately 16° with one another. This has the advantage that this not only prevents the drive unit arranged outside the wheel carrier from colliding with the vehicle frame when the wheel carrier is fully raised, but also that the distance between the drive unit and the road surface on which the wheels are located is still sufficient even when the wheel carrier is fully lowered.

In one refinement of the invention it is proposed that at least one drive unit comprises a fluidically, and in particular hydraulically, operable motor, and in particular an axial piston motor. In principle, however, it is also conceivable that at least one drive unit comprises an electric motor.

If the drive unit is designed as an axial piston motor, it is advantageous when the bend of the axial piston motor formed by the driven shaft of the axial piston motor on the one hand, and by the longitudinal direction of extension of the axial piston of the axial piston motor on the other hand, is arranged in a plane that is substantially parallel to the longitudinal direction of the wheel carrier.

It is furthermore advantageous when the connections, for feeding and discharging drive fluid to and from the drive unit, are arranged laterally on the drive unit.

According to a further aspect, the invention furthermore relates to a wheel assembly for a commercial vehicle. Reference is made to the above description of the commercial vehicle according to the invention with respect to the design options for the wheel assembly according to the invention.

Figure 2:
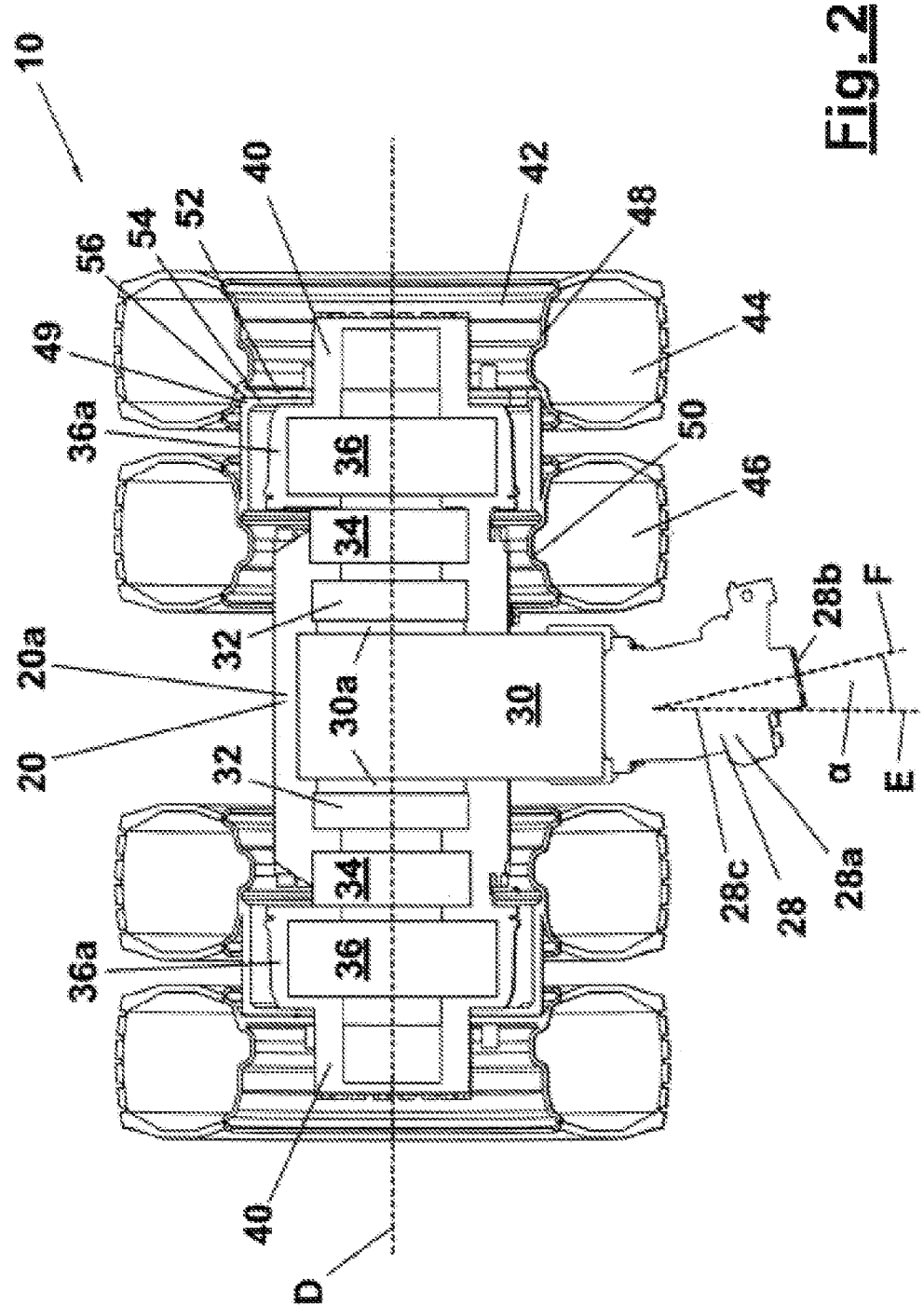

The invention will be described in greater detail hereafter based on an exemplary embodiment with reference to the accompanying drawings. In the drawings:

FIG. 1 shows a schematic lateral cross-sectional view of a commercial vehicle according to the invention, in particular of a vertically cut wheel assembly of the commercial vehicle according to the invention; and FIG. 2 shows the wheel assembly from FIG. 1 in a horizontally cut schematic cross-sectional view.

FIG. 1 shows a commercial vehicle 80 according to the invention and the frame 82 thereof in a roughly schematically illustrated manner in dotted lines. The commercial vehicle includes a plurality of wheel assemblies 10, of which one is shown in detail in FIG. 1.

The wheel assembly 10 comprises a pivot bearing 12, by way of which the wheel assembly is connected to the vehicle frame 82 of the commercial vehicle 80 so as to rotate about a substantially vertical axis A. The wheel assembly 10 furthermore comprises a carrier 14 which is fixedly connected to the pivot bearing 12 and has a swing arm 16 arranged at the free end. The swing arm 16 is mounted on the carrier 14 so as to pivot about a substantially horizontal axis B. At the end lying remote from the carrier 14, the swing arm 16 includes a bearing connector 18. A wheel carrier 20, which is described in greater detail hereafter, is mounted pivotably about a self-aligning axis C on the bearing connector 18.

The carrier 14 and the swing arm 16 are furthermore connected to one another by way of a power device 22. The power device 22 is designed as a fluidically actuatable piston/cylinder unit in the exemplary embodiment shown here. One end of the power device 22 is rotatably mounted on the carrier 14 by way of a ball and socket joint 24, while the other end of the power device 22 is rotatably connected to the swing arm 16, likewise by way of a ball and socket joint 26.

The pivot bearing 12, the carrier 14 and the swing arm 16 together form a bogie 15, by way of which the wheel carrier 20 can move toward the vehicle frame 82 and move away therefrom within the meaning of a level regulation (pivoting movement about the axis B), can be rotated about the vertical axis A within the meaning of a steering motion of the commercial vehicle 80, and can be pivoted about the self-aligning axis C within the meaning of compensating for an uneven road surface S.

It should be added that the wheel carrier 20 is rigidly connected to the swing arm 16, or to the free end of the bogie 15 located opposite the pivot bearing 12, with respect to rotational or pivoting movements about axes other than the self-aligning axis C.

FIG. 2 shows the wheel assembly 10, which is illustrated along a plane extending parallel to a longitudinal axis D of the wheel carrier 20.

A drive unit 28, which in the exemplary embodiment shown here is designed as a hydraulically actuatable axial piston motor arranged outside the housing 20a of the wheel carrier 20, and more particularly downstream of the wheel carrier housing 20a based on the forward driving direction of the commercial vehicle 80, is assigned to the wheel carrier 20. The drive unit 28 is aligned relative to the wheel carrier 20 in such a way that the axis E of the driven shaft 28c of the drive unit 28 is substantially perpendicular to the longitudinal axis D of the wheel carrier 20.

The bend typical of axial piston motors between an axis F extending parallel to the axial pistons of the axial piston motor 28 and the axis E of the driven shaft 28c extends in a plane that extends substantially parallel to the longitudinal axis D of the wheel carrier 20 in the illustrated exemplary embodiment. As is known per se, the angle of incidence a between the axes E and F can be varied by suitable activation of an appropriate mechanism 28a of the axial piston motor. The axial piston motor 28 furthermore comprises hydraulic connections 28b, which are arranged on two opposing sides of the axial piston motor 28 relative to the plane that is defined by the two axes E and F in a non-parallel alignment of these two axes. Since an extension of the mechanism 28a perpendicular to the axis F is typically larger than a distance of the hydraulic connections 28b perpendicular to the axis F, the aforementioned alignment of the drive unit 28 in relation to the wheel carrier 20 makes it possible to keep the vertical extension, for example parallel to the axis A (see FIG. 1), of the drive unit 28 small, since this is determined by the distance of the hydraulic connections 28b.

As is shown in FIG. 2, the driven shaft 28c of the drive unit 28 is engaged with a first gear step 30 so as to transmit torque. The first gear step 30 may be designed as or with a differential gear. The first gear step 30 has two output ends 30a, wherein the one output end 30a points in the direction of the one longitudinal end of the wheel carrier 20, and the other output end 30a points in the direction of the other longitudinal end of the wheel carrier 20. The two output ends 30a of the first gear step 30 are each connected to a clutch 32, which is connected on the output side to a respective second gear step 34. Each of the two second gear steps 34 is connected on the side located opposite the clutch 32 to a service brake 36, which brake devices approved for the operation of the commercial vehicle 80 according to the invention on public roads up to speeds of more than 25 km/h. The output sides 36a of the service brakes 36 are each connected to a wheel hub 40, which is mounted on the wheel carrier 20 so as to rotate relative thereto about an axis of rotation that is substantially parallel to the longitudinal axis D.

The first gear step 30, the two clutches 32 and the two second gear steps 34 are accommodated in the interior space I of the housing 20a of the wheel carrier 20.

The two clutches 32 are designed so as to be able to pass torque from the first gear step 30 on to the second gear step 34 when the commercial vehicle 80 is moving at a speed that is lower than a predetermined shifting speed. In this state, the commercial vehicle 80 can be operated as a self-propelled vehicle, which can be driven by way of the drive units 28. In this way, the commercial vehicle 80 can assist a tractor unit, for example, to which it is connected, in overcoming an uphill grade. If, in contrast, the speed of the commercial vehicle 80 exceeds the predetermined shifting speed, the clutches 32 open automatically, so that the torque flow from the first gear step 30 to the second gear step 34 is interrupted. In this state, the commercial vehicle 80 can be operated purely as a trailer vehicle, which is moved by way of a tractor unit.

Two main hydraulic lines 38 extend from the hydraulic connections 28b of the drive unit 28. A first section of the main hydraulic lines 38 is denoted by reference numeral 38a in FIG. 1, and the further progression of the main hydraulic lines 38 is indicated with dash-dotted lines in FIG. 1. A second section 38b of the main hydraulic lines 38 runs between the roadway S and the wheel carrier 20. The main hydraulic lines 38 then run in front of and behind the swing arm 16 (section 38c), and from there in front of and behind the carrier 14, substantially vertically upwardly (section 38d) to the vehicle frame 82, where the end sections 38e thereof can be seen.

To enable this progression, according to the invention the swing arm 16 has a narrow design in the vehicle width direction. This is made possible, in particular, by the design according to the invention of the ball and socket joint 26. More particularly, the socket of the ball and socket joint 26 is formed on the side of the power device 22, and the ball of the ball and socket joint 26 is formed on the side of the swing arm 16. This design of the mounting of the power device 22 on the swing arm 16 allows the swing arm 16 to have a more space-saving design, and in particular a narrower design in a direction perpendicular to the drawing plane of FIG. 1, compared to an arrangement of the ball of the ball and socket joint 26 on the power device 22 and of the socket of the ball and socket joint 26 on the swing arm 16.

It should be added that the socket of the ball and socket joint 24 is assigned to the carrier 14, and the ball of the ball and socket joint 24 is assigned to the power device 22.

A wheel 42 comprising dual tires is provided on each of the wheel hubs 40, wherein the dual tires each include an inner tire 46, which is to say adjoining the drive unit 28, and an outer tire 44, which is to say arranged on the side of the inner tire 46 facing away from the drive unit 28. Each of the two outer tires 44 includes a rim 48, and each of the two inner tires 46 includes a rim 50. Each of the rims 48 is assigned a wheel disk 52, and each of the rims 50 is assigned a wheel disk 54. When the dual tires are mounted on the wheel hub 40, the two sub-wheel disks rest 52 and 54 against one another.

The two wheel disks 52 and 54 can also be referred to as "sub-wheel disks" of a wheel disk 56 of the wheel 42. Analogously, the two rims 48 and 50 can be referred to as "sub-rims" of a rim 49 of the wheel 42 comprising these two sub-rims 48 and 50.

The two sub-rims 48 and 50, or the sub-wheel disks 52 and 54 thereof, have different offsets from one another in the illustrated exemplary embodiment. The offsets are selected in such a way that the wheel disk 56 of the rim 49 of the wheel 42 is arranged within the extension of the outer tire 44 determined in the longitudinal direction of the wheel carrier 20. With the track width of the wheels 42 remaining the same, it is thus possible to design the wheel carriers 20 to be longer, so that the interior space I of the wheel carrier 20, available for accommodating the aforementioned components, can also be designed to be larger.

As is apparent from FIG. 1 the angle of incidence ß between the axis E of the driven shaft 28c of the drive unit 28 and the roadway plane S changes when the wheel carrier 20 is pivoted about the axis B relative to the vehicle frame 82 by way of the swing arm 16. So as to ensure that the drive unit 28, in particular during steering maneuvers, does not collide with components of the commercial vehicle 80 when the wheel carrier 20 is fully retracted, and also does not collide with the roadway 5, for example, when the wheel carrier 20 is fully extended, the angle of incidence ß is between approximately 34° and approximately 50°, preferably between approximately 38° and approximately 46°, and still more preferably approximately 42° when the wheel carrier 20 is fully retracted (see FIG. 1), while it is between approximately −19.5° and approximately −3.5°, preferably between approximately −15.5° and approximately −7.5°, and still more preferably approximately −11.5° when the wheel carrier 20 is fully extended.

It should be added that the angle γ between the self-aligning bearing axis C and the driven shaft 28c of the drive unit 28 is between approximately 8° and approximately 24°, preferably between approximately 12° and approximately 20°, and still more preferably approximately 16°.

The invention claimed is:
1. A commercial vehicle, comprising:
 a vehicle frame; and
 a plurality of wheel assemblies mounted on the vehicle frame, at least one of the wheel assemblies comprising:
  an elongate wheel carrier having a longitudinal axis;
  a wheel that is rotatable about the longitudinal axis at each of the longitudinal ends of the wheel carrier;
  a drive unit for driving the wheels, wherein the drive unit is arranged outside a housing of the wheel carrier; and
  a transmission device, which is designed to lower the rotational speed of a driven shaft of the drive unit to a rotational speed of the wheels,
 wherein the at least one wheel assembly further comprises:
  a clutch device that selectively interrupts or establishes a power transmission connection between the drive unit and the wheels, and
  a brake device that is approved for an operation of the commercial vehicle on public roads up to speeds of more than 25 km/h.

2. The commercial vehicle according to claim 1, wherein the clutch device is designed so as to automatically interrupt the power transmission connection between the drive unit and the wheels when a predetermined speed of the commercial vehicle is exceeded.

3. The commercial vehicle according to claim 1, wherein the driven shaft of the drive unit extends substantially perpendicularly to the longitudinal axis of the wheels.

4. The commercial vehicle according to claim 3, wherein the driven shaft of the drive unit is connected to a differential gear comprising two output shafts having axes of rotation that are substantially parallel to the longitudinal axis of the wheels.

5. The commercial vehicle according to claim 1, wherein at least one of a separate clutch, a separate reducing gear, or a separate brake that is approved for the operation of the commercial vehicle on public roads up to speeds of more than 25 km/h is assigned to each of the wheels.

6. The commercial vehicle according to claim 1, wherein wheel disks of rims of two wheels have a positive offset.

7. The commercial vehicle according to claim 6, wherein each of the wheels of the wheel assembly includes dual tires, and wherein the positive offset is dimensioned such that one of the wheel disks is arranged within an extension of the tire of the respective wheel arranged remote from the wheel carrier.

8. The commercial vehicle according to claim 1, wherein the wheel carrier is connected to the vehicle frame by way of a bogie that is rotatably mounted on the vehicle frame, and wherein the wheel carrier is rigidly connected to a free end of the bogie with respect to a relative pivoting movement about an axis that is substantially parallel to the longitudinal axis of the wheel carrier.

9. The commercial vehicle according to claim 1, wherein a self-aligning bearing axis and the driven shaft of the drive unit form an angle (γ) between approximately 8° and approximately 24° with one another.

10. The commercial vehicle according to claim 1, wherein the drive unit comprises a fluidically operable motor.

11. The commercial vehicle according to claim 10, wherein the drive unit comprises an axial piston motor, and wherein a bend of the axial piston motor formed by the driven shaft of the axial piston motor on the one hand, and by a longitudinal direction of extension of an axial piston of the axial piston motor on the other hand, is arranged in a plane that extends substantially parallel to the longitudinal direction of extension of the wheel carrier.

12. The commercial vehicle according to claim 10, wherein connections or feeding and discharging drive fluid to and from the drive unit are arranged laterally on the drive unit.

13. The commercial vehicle according to claim 1, wherein the brake device is approved for an entire speed range of 0 km/h to 80 km/h.

14. The wheel assembly according to claim 1, wherein the drive unit comprises a fluidically operable motor.

15. The commercial vehicle according to claim 1, wherein a self-aligning bearing axis and the driven shaft of the drive unit form an angle (γ) of approximately 16° with one another.

16. The commercial vehicle according to claim 1, wherein the drive unit comprises a hydraulically operable motor.

17. A wheel assembly for a commercial vehicle, wherein the wheel assembly comprises:
 an elongate wheel carrier having a longitudinal axis;
 a wheel that is rotatable about the longitudinal axis at each of the longitudinal ends of the wheel carrier;
 a drive unit for driving the wheels, wherein the drive unit is arranged outside a housing of the wheel carrier;
 a transmission device designed to lower the rotational speed of a driven shaft of the drive unit to a rotational speed of the wheels;
 a clutch device that selectively interrupts or establishes a power transmission connection between the drive unit and the wheels; and
 a brake device that is approved for the operation of the commercial vehicle on public roads up to speeds of more than 25 km/h.

18. The wheel assembly according to claim 17, wherein the clutch device is designed so as to automatically interrupt the power transmission connection between the drive unit and the wheels when a predetermined speed of the commercial vehicle is exceeded.

19. The wheel assembly according to claim 17, wherein at least one of a separate clutch, a separate reducing gear, or a separate brake that is approved for the operation of the commercial vehicle on public roads up to speeds of more than 25 km/h is assigned to each of the wheels.

20. A commercial vehicle, comprising:
 a vehicle frame; and
 a plurality of wheel assemblies mounted on the vehicle frame, at least one of the wheel assemblies comprising:
  an elongate wheel carrier having a longitudinal axis;
  a wheel that is rotatable about the longitudinal axis at each of the longitudinal ends of the wheel carrier;
  a drive unit for driving the wheels, wherein the drive unit comprises a fluidically operable motor; and
  a transmission device, which is designed to lower the rotational speed of a driven shaft of the drive unit to a rotational speed of the wheels,
 wherein the at least one wheel assembly further comprises:
  a clutch device that selectively interrupts or establishes a power transmission connection between the drive unit and the wheels, and a brake device that is approved for the operation of the commercial vehicle on public roads up to speeds of more that 25 km/h.

\* \* \* \* \*